(12) United States Patent
Sarron (10) Patent No.: US 12,070,741 B2
(45) Date of Patent: Aug. 27, 2024

(54) LOAD-FOLLOWING REACTOR SYSTEM, ASSOCIATED FACILITIES, AND METHOD OF OPERATING THE SAME

(71) Applicant: CRI HF, Kopavogur (IS)

(72) Inventor: Emeric Sarron, Paris (FR)

(73) Assignee: CRI HF, Kopavogur (IS)

( * ) Notice: Subject to any disclaimer, the term of this patent is extended or adjusted under 35 U.S.C. 154(b) by 273 days.

(21) Appl. No.: 17/842,407

(22) Filed: Jun. 16, 2022

(65) Prior Publication Data

US 2022/0401904 A1    Dec. 22, 2022

Related U.S. Application Data

(63) Continuation of application No. 17/155,977, filed on Jan. 22, 2021, now Pat. No. 11,369,932.

(60) Provisional application No. 62/965,605, filed on Jan. 24, 2020.

(51) Int. Cl.
 *B01J 8/02*    (2006.01)

(52) U.S. Cl.
 CPC .... *B01J 8/0285* (2013.01); *B01J 2208/00132* (2013.01); *B01J 2208/00168* (2013.01)

(58) Field of Classification Search
 CPC ....... B01J 4/00; B01J 4/008; B01J 8/00; B01J 8/001; B01J 8/02; B01J 8/0285; B01J 8/06; B01J 8/065; B01J 2204/00; B01J 2204/007; B01J 2208/00; B01J 2208/00008; B01J 2208/00017; B01J 2208/00026; B01J 2208/00035; B01J 2208/00088; B01J 2208/00106; B01J 2208/00115; B01J 2208/00132;
(Continued)

(56) References Cited

U.S. PATENT DOCUMENTS 3,466,152 A    9/1969    Yamamoto et al.
3,979,183 A    9/1976    Scott
4,249,907 A    2/1981    Callejas
(Continued)

FOREIGN PATENT DOCUMENTS

CA    2354927 A1    2/2002
CN    108779051 B    1/2022
(Continued)

OTHER PUBLICATIONS

International Search Report from corresponding PCT Application No. PCT/IB2021/050514, Apr. 8, 2021.
(Continued)

*Primary Examiner* — Natasha E Young
(74) *Attorney, Agent, or Firm* — Workman Nydegger (57) ABSTRACT

A load-following reactor system and associated facilities for improved control of a reactor under varying loads. The load-following reactor may be a tube-cooled reactor for methanol synthesis. A reactant may be controlled by at least one valve element such that a portion of the reactant is fed to the reactor through the reactor tubes, and a portion of the reactant is fed to the reactor after being heated in a heat exchanger. The heated portion of the reactant may be fed to the reactor after the tubes. The valve element may be controlled based on a temperature of the reactor and/or a flowrate of reactant feed to adapt the temperature of the reactor to the changing reactant flowrate.

20 Claims, 7 Drawing Sheets

(58) Field of Classification Search
CPC .... B01J 2208/00168; B01J 2208/00575; B01J 2208/00548
See application file for complete search history.

(56) References Cited

U.S. PATENT DOCUMENTS

| | | | |
|---|---|---|---|
| 4,272,823 | A | 6/1981 | Pool |
| 4,341,737 | A | 7/1982 | Albano et al. |
| 4,626,552 | A | 12/1986 | Arcuri |
| 6,905,592 | B2 | 6/2005 | Bence et al. |
| 6,958,135 | B1 | 10/2005 | Filippi et al. |
| 7,122,149 | B2 | 10/2006 | Li et al. |
| 7,144,923 | B2 * | 12/2006 | Fitzpatrick ............ C07C 29/152 518/706 |
| 7,347,978 | B2 | 3/2008 | Lomax, Jr. et al. |
| 7,353,847 | B2 | 4/2008 | Early |
| 7,790,775 | B2 | 9/2010 | Early |
| 7,968,610 | B2 | 6/2011 | Tasso et al. |
| 8,506,910 | B2 | 8/2013 | Singh et al. |
| 9,283,531 | B2 | 3/2016 | Banerjee et al. |
| 11,369,932 | B2 | 6/2022 | Sarron |
| 11,603,342 | B2 | 3/2023 | Urakawa et al. |
| 2007/0280862 | A1 | 12/2007 | Davis et al. |
| 2008/0217489 | A1 | 9/2008 | Higbee |
| 2019/0168155 | A1 | 6/2019 | Sarron et al. |
| 2020/0207689 | A1 | 7/2020 | Urakawa et al. |

FOREIGN PATENT DOCUMENTS

| | | |
|---|---|---|
| EP | 0135357 A2 | 3/1985 |
| EP | 2450100 A1 | 5/2012 |
| EP | 3416936 B1 | 3/2021 |
| GB | 2560784 A | 9/2018 |
| WO | 2013171239 A1 | 11/2013 |
| WO | 2017153304 A1 | 9/2017 |
| WO | 2018107170 A1 | 6/2018 |

OTHER PUBLICATIONS

Shahrokhi, M., et al. "Modeling, Simulation and Control of a Methanol Synthesis Fixed-Bed Reactor," Published in Chemical Engineering Science vol. 60, pp. 4275-4286, Apr. 18, 2005.

Al Fadli, A.M., et al. "Simulation of Transients in a Multi Bed Adiabatic Methanol Synthesis Reactor" Published in the Fourth Saudi Engineering Conference, vol. 5, pp. 121-127, Nov. 30, 1995.

Bremer, Jens, et al. "CO2 Methanation: Optimal Start-Up Control of a Fixed-Bed Reactor for Power-To-Gas Applications" Published in Process Systems Engineering, 22 pages, Sep. 2, 2016.

* cited by examiner

FIG. 4

LOAD-FOLLOWING REACTOR SYSTEM, ASSOCIATED FACILITIES, AND METHOD OF OPERATING THE SAME

CROSS REFERENCE TO RELATED APPLICATIONS

This application is a continuation under 35 U.S.C. § 120 of U.S. application Ser. No. 17/155,977, now U.S. Pat. No. 11,369,932, filed Jan. 22, 2021, which claims the benefit of priority under 35 U.S.C. § 119(e) to U.S. Provisional Application No. 62/965,605, filed Jan. 24, 2020, the entire contents of each of which are incorporated herein by reference.

FIELD OF THE DISCLOSURE

The disclosure relates to a load-following reactor, associated components, and a method for implementing or operating the same. The load-following reactor and associated components may be configured to carry out a chemical reaction and to respond to varying flowrates of reactants, as is common when converting reactants that are derived from renewable-energy sources. The load-following reactor may be arranged with associated components that facilitate heat transfer and/or heat integration to adapt a process condition of the load-following reactor, such as temperature, in response to a change in the flowrate of one or more reactants or a change in process conditions.

BACKGROUND

A pressing dilemma in the effort to provide clean and renewable energy worldwide is the inherent variability of wind, solar, geothermal, hydro, tide, and other sources of renewable energy, and the inability to store energy from renewable sources during times of peak production for later use in times of high demand. Frequently the times of peak production of renewable energy sources, especially wind and solar, does not match times of high demand, and even when renewable energy sources are producing energy, the ability of a region's electrical grid to accommodate the renewable energy may be limited by the slow turnaround or adaptability of existing power plants.

It is known, for example, that during hot summer months, peak energy demand occurs in the afternoon hours as people run air conditioning units in their homes and offices, but peak wind production often occurs later in the evening or in the morning. Solar power can only be collected during the daytime and under favorable conditions. Sources of renewable energy, moreover, are frequently located remotely from consumers and from transmission lines, which complicates the transport and efficient consumption of the energy within existing electrical grids. With a greater than ten-fold increase in the amount of power being produced by wind and solar power since 2005, the challenge of successfully accommodating and utilizing renewable power has grown substantially and will continue to grow for the foreseeable future.

It is precisely because of the difficulty of storing energy at its moment of production and utilizing the energy at the moment of demand that fossil fuels such as coal, petroleum, and natural gas have long been the main components of the global energy mix, as these substances are stored renewable energy in the form of hydrocarbons, particularly solar energy. With global energy consumption projected to grow by 50% by 2050—an increase of nearly 300 quadrillion BTUs per year over current consumption—the need for new modalities for producing, storing, and utilizing sustainable energy is urgent.

Without an effective way to accommodate the energy from renewable sources in the electrical grid during times of high demand, and without a viable storage option, this renewable energy is often curtailed, wasted, or grounded. Often it is not possible to simply reduce the output of baseline sources of energy, or base-load power plants such as coal or nuclear power plants, because rapidly reducing and later rapidly increasing the output of such plants may not be operationally feasible.

Indeed, such plants are often so finely calibrated to a particular level of production that variations therefrom, such as to accommodate a sudden and large increase in wind energy, may result in a catastrophic or costly shutdown or incident of the facility, which may take days to recover from. But to avoid blackouts, the amount of power available in the grid must always be equal to demand. Grid stability, therefore, is an impediment to the wide adoption of renewable energy sources that are inherently variable.

To address this problem, grid operators often employ flexible power plants known as peak-load power plants or "peakers." These facilities operate less regularly than base-load power plants, some as little as 250 hours per year, and are designed to be quickly ramped up to 100 percent load as quickly as possible to accommodate fluctuations in demand or production. Peakers are often deployed during periods of high or peak demand, such as during the summer months, and have more recently been used to balance the production from renewable sources. Load-following power plants, by contrast to base-load and peak-load power plants, are operated in direct response to changing demand for power supply.

Load-following power plants can be utilized as a balancing asset for renewable energy, and are configured to operate at lower loads to balance to variability of renewables, which vary minute to minute. Such plants ordinarily use gas turbines or hydroelectric plants due to the ability to quickly ramp up or ramp down, at the cost of efficiency and at a higher capital and operating cost. In short, the primary approach to renewable-energy integration into existing power grids has been the provision and use of load-following or otherwise flexible power plants—which are often costly and inefficient—to reduce power production when renewable production peaks, and to increase power production when renewable production wanes.

An alternative to providing load-following power plants is to store energy during peak production for later use, but existing renewable-energy storage modalities tend to be prohibitively expensive, difficult to scale up, or both. For example, it is possible to compress gases in underground caverns (such as abandoned mines) during peak production and then to release the compressed gases through a power-generating turbine later during peak demand. This can also be done with pumped water, i.e. storing energy as potential energy of the water at a higher elevation during peak production and re-capturing the energy later in the form of kinetic energy as the water flows back down during peak demand. While such hydraulic storage options are obviously limited by location, cost, and scalability, to date the vast majority of global energy storage capacity is in pumped-storage hydroelectric.

Thermal energy storage can be used by, for example, solar power plants to accumulate energy in the form of heat using materials such as molten salts, with the energy released later in the day. Alternatively, a pumped heat electrical storage system may be used, pumping heat from a cold store to a hot store, with the heat pump reversed to extract the stored energy. As with hydraulic storage options, thermal energy storage options are limited by location, cost, maintenance concerns, and scalability. Thermal energy storage may be best suited for incremental and site-specific improvements, such as reducing the energy inefficiencies of an office building, rather than as a large-scale option for energy storage.

Lithium-ion batteries are able to store energy from renewable sources, but at a cost of between $380 per kWh and $900 per kWh, batteries are prohibitively expensive, especially at a large scale—the United States alone consumed an estimated 100 quadrillion BTUs in 2018, or about three hundred billion kWh. Thus providing energy storage for a significant fraction of a nation's energy consumption through batteries is not economically feasible at present.

Yet further energy-storage modalities include mechanical energy storage through the use of flywheels or other mechanical implements such as concrete blocks, which are likewise limited by capital and operating costs. Another mode of energy storage is chemical energy storage, particularly hydrogen energy storage, in which excess electrical energy, developed during peak production of renewable energy, is used to electrolyze water into oxygen and hydrogen, with the hydrogen later used to produce electrical energy in a fuel cell or a gas turbine. The hydrogen can be stored in artificial containers such as tanks (with some difficulty due to the diminutive size of hydrogen molecules, which can escape through a steel tank), or underground caverns such as salt domes. Hydrogen storage is also inefficient and difficult to scale-up, due to the explosive nature of hydrogen gas which poses engineering challenges when being accommodated by the existing energy and petrochemical infrastructure of most developed nations.

The use of methanol to store energy from renewable energy sources is described in U.S. Patent application publication no. 2019/0168155, published on Jun. 6, 2019, and U.S. Pat. No. 8,506,910, filed Apr. 20, 2012, both references incorporated herein in their entirety by reference. Methanol is produced from syngas comprising hydrogen gas obtained from the electrolysis of water and carbon dioxide ($CO_2$) obtained from any suitable source, including industrial point sources, like power plants. The syngas is reacted over a suitable catalyst such as a copper-zinc catalyst in a reactor, with a mixture of methanol, water, byproducts, and unreacted feedstock in the reactor effluent, which may then be separated as described in U.S. Patent application publication no. 2019/0168155.

Methanol is advantageous relative to hydrogen, and thus the "methanol economy" is advantageous relative to the "hydrogen economy," in that methanol is an alternative chemical-storage disposition for renewable energy and naturally a liquid that is denser, safer, and more easily accommodated by existing energy and petrochemical infrastructure than hydrogen gas. Methanol also has important dispositions to further chemical synthesis processes (including formic acid, formaldehyde, methyl tert-butyl ether, acetic acid, methyl methacrylate, dimethyl terephthalate, dimethyl carbonate (DMC), methylamines, methyl chloride, methanethiol, dimethyl ether, and olefins such as ethylene and propylene), as a transportation fuel, in fuel cells, in wastewater treatment, and in electricity production.

A problem with producing methanol from renewable energy, as described in U.S. Patent application publication no. 2019/0168155, is that as the amount of renewable energy produced varies or fluctuates, the facility for producing methanol therefrom must be adapted accordingly in order to optimally operate. The amount of renewable energy produced is proportional to the amount of hydrogen gas obtained through electrolysis. A corresponding or stoichiometric amount of $CO_2$ from suitable sources may be provided according to the varying amount of hydrogen gas, resulting in a varying amount of syngas that is fed to the reactor.

Because the synthesis of methanol from $CO_2$ and hydrogen gas is exothermic, and because the reactor conditions impact the efficiency and yield of the reaction, the reactor must be adapted to changing loads of syngas to avoid such adverse effects of overheating as catalyst sintering, thermal runaways, and product degradation. Conversely, adverse effects of operating below steady-state temperature may result in inefficient conversion and buildup of undesired byproducts, for example from the endothermic reverse water-gas shift reaction.

Adjusting the temperature of a reactor to achieve a steady-state operation, such as at start-up, is notoriously challenging. Highly dynamic temperature-control systems are employed just for maintaining a steady-state operation. Operating at start-up or non-steady-state conditions, which differ from the steady-state conditions, presents further control challenges and results in poor selectivity and yield, and can risk catastrophic failure of the reactor vessel or associated components and facilities.

The period from start-up of a reactor to "line-out" or steady-state operation for such reactions can range from hours to days or weeks. In view of the minute-to-minute variability of renewable energy, such lengthy procedures for achieving line-out or steady-state operation are not acceptable or economically feasible, particularly in view of the reduced selectivity and productivity when the reactor is not operating at steady-state. The difficulty of adjusting the temperature of the reactor is in part due to thermal inertia of the reactants and the catalyst and the reactor vessel itself, compounding the difficulty of quickly and precisely adjusting the temperature in a reactor to a desired value. That is, the thermal inertia of the reactor system may slow down the transport of heat relative to the transport of mass, which is of increased significance in exothermic reactions where fluctuations, including substantial increases in the mass flow rate, are anticipated. For example, the reactor may heat up more slowly at a top portion of the reactor compared to a bottom portion of the reactor when a load increases, due to the slower rate of reaction at the top of the reactor.

Existing facilities for adjusting the temperature of a reactor are often highly complex and poorly adapted to the increases and decreases in flowrate associated with a load-following reactor. For instance, certain reactors are outfitted with heating elements proximate a catalyst bed. Other reactors may vary a bed of a multi-catalyst-bed reactor and associated facilities such as inter-bed heat exchangers to which a reactant may be fed to obtain a temperature profile across certain of the catalyst beds.

The existing solutions for the problem of reactors being difficult and slow to adapt to a changing process condition are complex and lack the ability to both quickly increase or decrease the temperature of the reactor as a whole. Further, existing attempts to address this problem inefficiently add and remove heat, thereby increasing the operating expenses (OPEX) of a facility, which puts additional economic pressure on a facility storing renewable energy. In many instances, it is economically unfeasible to operate such a facility using the existing modalities for adapting the temperature of a reactor. The necessary maintenance of the complicated facilities provided by the existing modalities, such as heating coils, heat exchangers, or other heat-transfer-related facilities that are provided in an attempt to adjust the temperature of the reactor, further increases OPEX, not to mention capital expenses (CAPEX).

In view of the exothermic nature of certain reactions that may be utilized in a load-following reactor system and associated facilities according to the embodiments of the disclosure, including methanol synthesis, methanation of CO, $CO_2$, and $H_2$, and others, it is also critical to maintain control of the load-following reactor system to avoid thermal runaways, catalyst sintering, and other high-temperature-related concerns.

A facility including a reactor for producing methanol from syngas derived from renewable energy may be configured as a load-following reactor and facility by adapting conditions and equipment to accommodate varying loads of feedstock based on the production of renewable energy. Nevertheless, in view of the foregoing challenges to adapting critical equipment including the reactor to changing loads, particularly in the context of the reactor temperature, few if any load-following applications of chemical energy storage are in use.

From the foregoing, there is a need for an improved inexpensive load-following reactor, associated facilities, and method for operating the same, to provide improved energy storage and adaptability to varying loads of feedstocks while not substantially increasing the OPEX costs.

SUMMARY

The embodiments of the disclosure discuss a load-following reactor, associated facilities, and methods for operating the same, that address the problem of reactors having variable-load feedstock or reactants operating suboptimally and inefficiently at non-steady-state conditions. The load-following reactor system may comprise associated facilities such as heat-integration facilities, including a controller, to adjust and control process conditions of the load-following reactor, such as temperature, in response to a change in the amount of reactants, thereby adapting the load-following reactor to the different flowrate of reactants and more quickly achieving steady-state or equilibrated operation.

The load-following reactor may be a reactor comprising tubes and/or a suitable catalyst, such as a methanol-synthesis catalyst. The reactor may comprise one or more tubes that facilitate heat integration within the reactor and the catalyst. For example, the one or more tubes may be configured to extend within the reactor body and through a catalyst or catalyst bed from a starting or beginning portion of the tubes to an end portion of the tubes. The reactants may be passed through the tubes and thereby may exchange heat with the catalyst, the reactor internals, and/or the reactants, byproducts, and products before the heated reactants are disposed to the catalyst. The reactor may comprise a swirler at a turnaround point, for example the point where the reactants exit the tubes and then begin to flow directly through the reactor and/or catalyst bed. The swirler may ensure that the reactants are properly mixed.

In exothermic reactions, the provision of the one or more tubes to provide the reactants can advantageously extract heat from the ongoing reaction and preheat the reactants to the reaction temperature, thereby minimizing additional heat exchange. In endothermic reactions, the provision of the one or more tubes can be configured to provide heat from the reactant to the ongoing reaction to facilitate the reaction. The associated heat-integration facilities may be configured to vary a flowrate of reactants or heat-exchange media through the tubes to achieve, reach, or maintain a target temperature.

In embodiments, the flowrate of fresh reactant, such as $H_2$ in a methanol-synthesis context, increases subject to its availability. When excess power, such as that derived from renewable energy sources, is disposed to an electrolysis process, for example, the flowrate of fresh $H_2$ reactant may correspondingly—and temporarily—increase. The flowrate of $CO_2$, such as produced in a power plant, may be correspondingly increased to accommodate the increased $H_2$ and to provide an appropriate ratio of components of synthesis gas ("syngas") provided to the particular catalyst used in the reactor.

Because an increase in the flowrate of reactants without a corresponding change in reactor conditions may adversely affect the conversion and selectivity of the ongoing reaction, the controller may be configured to adjust various process conditions to achieve a desired temperature in the reactor so as to achieve optimal conversion of the reactants. When excess power generation leads to increased $H_2$ production and an increase in reactant flow, the controller may actuate a valve element that controls the disposition of the reactants.

A suitable portion of the reactants may be diverted by the valve element to a first feed line to the reactor, while a remaining portion of the reactants may be conveyed by a second feed line to the reactor. As the remaining portion of the reactants conveyed by the second reactor feed line passes as per normal operation through the tubes of the reactor, the first feed line may undergo further heat exchange to increase the temperature of the reactants in the first feed line. The first feed line may be connected to the reactor such that the reactants conveyed therethrough bypass, partially, substantially, or entirely, the tubes. Additionally, by decreasing the proportion of the reactants that are conveyed through the tubes, less heat (in an exothermic operation) is removed from the reactor.

The effect of the diversion by the valve element when the reactants quickly increase and in an exothermic operation may be to increase the temperature of the reactor itself and of the reactants just prior to the reaction, which allows the reaction to quickly and seamlessly achieve steady-state with a reduction in inefficiencies, such as an undesirable increase in the production of byproducts due to mismatched reactor conditions and flowrates.

In embodiments, the valve element comprises first and second valves on each of the first and second feed lines to the reactor, allowing the controller to precisely control the flowrates of reactants. For example, an entirety of the reactant feed may be allowed to pass through the tubes, or an entirety of the reactant feed may be diverted to the first feed line to undergo further heat exchange and/or to bypass the tubes, or any suitable division of the reactant feed may be effected as suitable to attain desired process conditions in the reactor and associated facilities.

In embodiments, the further heat exchange to which the first feed line is disposed is provided in a dedicated first heat exchanger. The first heat exchanger may be configured to provide heat to the first feed line through any suitable heat-exchange medium, such as steam. In embodiments, the first heat exchanger may be heat integrated with a reactor effluent stream, providing the first feed line with heat extracted from the heated reaction products. In other embodiments, the first heat exchanger may be adapted to remove heat from the reactants via any suitable heat-exchange medium, such as cooling water.

When heat-integrated with the reactor effluent stream, the first heat exchanger may be arranged to receive heat from a substantial entirety of the reactor effluent stream or from a side stream portion of the reactor effluent stream. In embodiments where a side stream portion of the reactor effluent stream heats the first feed line via the first heat exchanger, an additional valve element may be configured on the side stream portion for additional and fine-tuned process control. The cooled side stream portion may, after heating the first feed line, be rejoined with the reactor effluent line at any suitable location.

The reactants may be pre-heated by a second heat exchanger before any diversion by the at least one valve element to the first and second feed lines occurs. The second heat exchanger may be heat integrated with the reactor effluent line. In embodiments, both the first and second heat exchanger are heat integrated with the reactor effluent line. The first heat exchanger may be arranged between the reactor and the second heat exchanger, or may be arranged downstream of the second heat exchanger relative to the reactor.

In embodiments, the reactor effluent stream may be heat-integrated with any suitable process or disposition; in an embodiment, the reactor effluent stream may provide reboiler duty for a downstream separations process, such as a fractionator that separates the crude reaction products into refined products. For example, this arrangement may be particularly beneficial when producing synthetic methanol from renewable $H_2$ and $CO_2$, as the crude methanol product from the reactor may comprise entrained water, $CO_2$, CO, or other substances that must be fractionated to arrive at a methanol product of sufficient purity.

The efficiency of the reactor system and associated facilities may be enhanced by providing a preliminary separations section and recycle facilities. The reactor effluent may be heat-exchanged, such as cooled or condensed, downstream of the reactor block by a heat exchanger using any suitable heat-exchange medium, such as cooling water. The condensation of the product serves to facilitate a separation of gaseous unreacted synthesis gas (including, for example, $H_2$ and $CO_2$) and the reaction products. A flash drum or catch pot may separate remaining gaseous components, such as unreacted synthesis gas and gaseous byproducts such as CO, from the condensed liquid product, with the gaseous components recycled back to the reactor.

A hydrogen recovery unit may be provided to remove $H_2$ from at least a portion of the separated gaseous components and may produce or extract a waste gas stream, with remaining syngas recycled to the fresh reactant feed. A compressor or circulator may be arranged to compress at least a portion of the separated gaseous components to be disposed to the reactor with the fresh reactant feed.

The condensed liquid product may be further processed preparatory to a downstream separations or recovery unit in a second flash drum, with flash gas—comprising any remaining unreacted syngas, byproducts, or other light components—sent to recycle, to waste gas, to battery limits, or to another process, and the remaining liquid product being disposed to storage, battery limits, downstream separations processes such as fractionation, or further processes. In embodiments, crude methanol product may be disposed to a further processing unit as feedstock for a formaldehyde- or DMC-synthesis process, for example. To effect a more complete separation of gaseous components from the condensed liquid product, the second flash drum may operate at a lower pressure than the first flash drum.

By providing a load-following reactor system, associated facilities, and a method for operating the same according to embodiments of the disclosure, the problem of existing chemical synthesis units being ill-suited to adapt to changing reactor feeds, in particular a reactor being slow or difficult to bring to steady-state operation based on a changing reactor feed, is addressed. The disclosed embodiments better enabling a reactor system and associated facilities to load-follow for energy storage and other applications while not substantially increasing the CAPER or OPEX of the system and process.

Other methods, embodiments, and variations of the system are described in greater detail in the following discussion.

BRIEF DESCRIPTION OF THE DRAWINGS

These and other features, aspects, and advantages of the present invention will become readily apparent and better understood in view of the following description, appended claims, and accompanying drawings.

The drawing figures are not necessarily drawn to scale, but instead are drawn to provide a better understanding of the components, and are not intended to be limiting in scope, but to provide exemplary illustrations. The figures illustrate exemplary configurations of load-following reactor systems and associated facilities, and in no way limit the structures, configurations or functions of load-following reactor systems and associated facilities embodiments according to the present disclosure.

DETAILED DESCRIPTION OF VARIOUS EMBODIMENTS

A better understanding of different embodiments of the invention may be had from the following description read with the accompanying drawings in which like reference characters refer to like elements.

While the disclosure is susceptible to various modifications and alternative constructions, certain illustrative embodiments are shown in the drawings and will be described below. It should be understood, however, there is no intention to limit the disclosure to the embodiments disclosed, but on the contrary, the intention is to cover all modifications, alternative constructions, combinations, and equivalents falling within the spirit and scope of the disclosure and defined by the appended claims.

It will be understood that, unless a term is defined in this patent to possess a described meaning, there is no intent to limit the meaning of such term, either expressly or indirectly, beyond its plain or ordinary meaning.

The embodiments of a load-following reactor system, associated facilities, and methods for operating the same according to the present disclosure advantageously allow a reactor system to more effectively load-follow for applications such as but not limited to energy storage, by enabling the reactor and associated facilities to easily and quickly adapt to changing process conditions, thereby minimizing inefficiencies due to mismatched process conditions.

Because reactors are typically sized for a particular set of optimized kinetic parameters that aim to optimize yield, conversion, and selectivity, operating a reactor at flowrates different from the design case requires a corresponding change in the other kinetic parameters at which the reactor operates. For example, as a flowrate of a reactant changes, the load-following reactor system embodiments according to the disclosure may advantageously adjust a temperature of the reactor to an adjusted target value to rapidly achieve steady-state operation, preferably at the reaction equilibrium, thereby maintaining a suitable conversion of reactants and minimizing operating expenses (OPEX).

In an exemplary embodiment, as the flowrate of reactants increases due to an increased load of renewable electricity, the reactor temperature may be adjusted upward to a higher temperature and a higher equilibrium constant, following the increase in the load of energy and reactants. The increased temperature results in a faster reaction rate and an equilibrium constant that compensates for the shorter residence time of the reactants in the reactor. In an exothermic reaction like methanol synthesis, the higher temperature may increase conversion and reduce selectivity, allowing the reactor system and associated facilities to process the increased flowrate of reactants.

Likewise, as the flowrate of reactants decreases, the reactor temperature may be correspondingly adjusted downward to a lower temperature and a lower conversion rate that reflects the longer residence time, reduces OPEX in the form of byproduct- and unreacted syngas-separation and recycling processes, improves selectivity and disfavors side reactions such as the reverse water-gas shift reaction, and minimizes product degradation. Doing so allows the reactor system embodiments to follow the decrease in the load of energy and reactants. Corresponding or other changes to process conditions such as pressure, recycle rates, and the concentration of individual reactants may similarly be adjusted as necessary.

The load-following reactor system and associated facilities embodiments of the disclosure may adjust the temperature of the reactor to and/or based on a non-uniform temperature profile across the reactor defining a peak shape. For example, when the load is low (i.e. the flow of reactants is reduced relative to a base case), the reactor temperature may define a peak-shaped profile with the peak proximate the top of the reactor. By contrast, when the load is high (i.e. the flow of reactants is increased relative to a base case), the reactor temperature may define a peak-shaped profile with the peak proximate the bottom of the reactor. The dynamic nature of the peak-shaped profile contributes to the thermal inertia of the reactor and the reactants. The load-following reactor system embodiments of the disclosure advantageously reduce the time to overcome the thermal inertia of the reactor and catalyst and to reallocate heat within, and consequently relocate a temperature profile of, the reactor. By so doing, the heat transfer occurring within the reactor can be more quickly and precisely controlled.

Figure 1A:
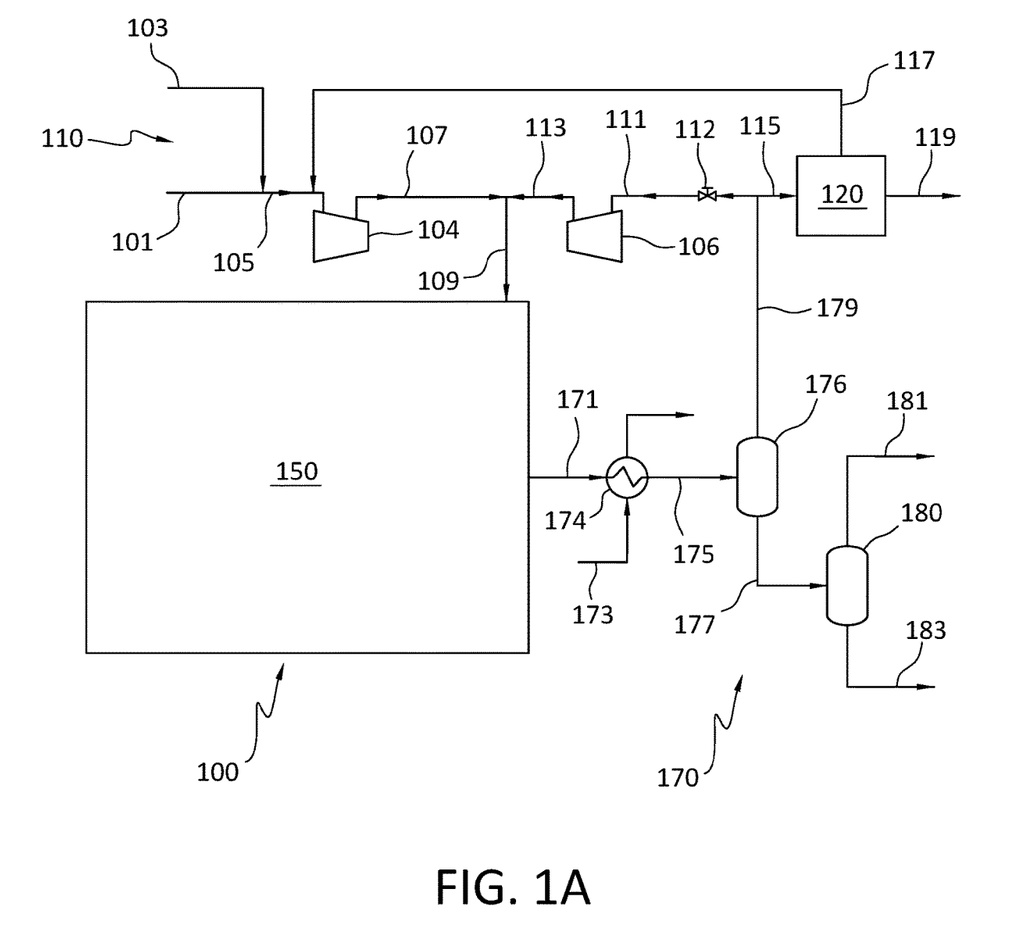
FIG. 1A is a simplified diagram of a load-following reactor system and associated facilities according to an embodiment of the disclosure.

A load-following reactor system and associated facilities according to an embodiment is shown in the simplified process flow diagram of FIG. 1A. A reactor system 100 may include a reactor block 150, a feed section 110, a preliminary separation section 170, and a hydrogen recovery unit 120. In an exemplary but non-limiting embodiment, the reactor system 100 is configured as a methanol-synthesis facility, with the feed section 110 providing fresh $H_2$ feed 103 and fresh $CO_2$ feed 101. The fresh $H_2$ feed may be derived from one or more electrolysis processes, whereby renewable electrical energy is utilized to produce $H_2$ and $O_2$ from water, or derived and purified for a second industrial process. The fresh $CO_2$ feed 101 may be obtained from any suitable source, such as a point source from an industrial or fossil-fuel-based power plant, or extracted and purified from dilute atmospheric sources. Fresh $H_2$ and $CO_2$ together define a syngas mixture suitable for methanol production using appropriate catalysts, such as a conventional Cu—Zn based catalyst or more exotic precious metal catalysts as are known to a skilled person.

The combined fresh feed stream 105 is combined with recycle syngas stream 117 and compressed to a suitable reaction pressure in a syngas compressor 104. The compressed combined syngas stream 107 may be combined with a compressed recycle gas stream 113 before a combined reactant stream 109 is disposed to the reactor block 150, which will be described in greater detail herein. The reactor block 150 may be arranged as a load-following reactor for converting the syngas comprising substantially $H_2$ and $CO_2$ to a methanol product. While in the disclosed embodiment, fresh $H_2$ and $CO_2$ are described, it will be understood that the disclosed embodiments are merely exemplary, and any suitable reaction suite may be utilized. For example, a conventional syngas comprising a blend of $H_2$, $CO_2$, and CO may similarly and effectively be utilized.

A reactor effluent or product stream 171 may be conveyed from the reactor block 150 to a heat exchanger 174. The heat exchanger 174 may be arranged as a condenser, and may be cooled using any suitable heat-exchange medium provided at stream 173. The heat-exchange medium may be cooling water or any other suitable medium. The heat exchanger 174 may be configured to condense the reactor effluent or product stream 171 such that a condensed product stream 175 is conveyed to a first flash drum or catch pot 176.

The first flash drum 176 is configured to enact a first separation of the components in the reactor effluent, which, upon leaving the reactor block 150, comprises a combination of methanol product, byproducts, and unreacted syngas, each component of which may have different thermodynamic properties. By conveying the condensed product stream 175 to and through the first flash drum 176, uncondensed or noncondensible fluids, such as unreacted syngas comprising $CO_2$, $H_2$, and CO, may be substantially removed via a first off-gas stream 179.

The off-gas stream 179 may convey the unreacted syngas to the hydrogen recovery unit 120 via a second off-gas stream 115. Alternatively, the unreacted syngas may be conveyed to a syngas circulator or compressor 106 by a third off-gas stream 111 under control of a valve 112. The unreacted syngas in the third off-gas stream 111 may be re-pressurized to a desired operating pressure, for example of the reactor block 150, and then combined with the combined syngas stream 107.

The hydrogen recovery unit 120 may extract hydrogen from the unreacted syngas and other components in the first off-gas stream 179. The hydrogen recovery unit 120 may generate a waste gas stream 119 to be vented to atmosphere, flared, removed to battery limits, stored, burned or otherwise consumed in a furnace or other facility, or otherwise disposed of. The composition of the waste gas stream 119 may be chosen based on pertinent regulations and process conditions. The hydrogen recovery unit 120 may further provide the recycle syngas stream 117 to be combined with the combined fresh feed stream 105 to be thereafter recycled to the reactor block 150.

The hydrogen recovery unit 120 may be any suitable hydrogen recovery facility, utilizing such known technologies as pressure-swing adsorption (PSA) units, membrane purification units, cryogenic separation units, or otherwise. A reactor system 100 may include a hydrogen recovery unit 120 in any suitable location or configuration and based on any suitable process constraint, taking into account downstream or alternative $H_2$ dispositions, current $H_2$ production levels, or otherwise.

The remaining condensed product after separation in the first flash drum 176 may be conveyed to a second flash drum 180 by a liquid effluent line 177. The second flash drum 180 similarly may separate the liquid product from waste gas that remains entrained in the liquid product. The second flash drum 180 may be operated at any suitable process conditions, and may be operated in embodiments at a lower pressure than the first flash drum 176 so as to effect a more complete separation of the entrained gaseous components. The separated gaseous components may be removed by a second waste gas stream 181, which, like the waste gas stream 119, may be vented, flared, removed to battery limits, stored, burned or otherwise consumed in a furnace or other facility, or otherwise disposed of.

The remaining liquid product remaining after the separation effected by the second flash drum 180 may comprise an enhanced fraction of reaction product, such as crude methanol when syngas is the reactant, and may be disposed in any suitable manner. For example, the reaction product in stream 183 may be stored, disposed to battery limits, further processed in a downstream chemical processing unit, or further refined in a separations section. The downstream separations section may be a separations unit as described in U.S. Patent publication no. 2019/0168155, published Jun. 6, 2019, belonging to the assignee of the present disclosure and which is incorporated herein by reference in its entirety.

Figure 1B:
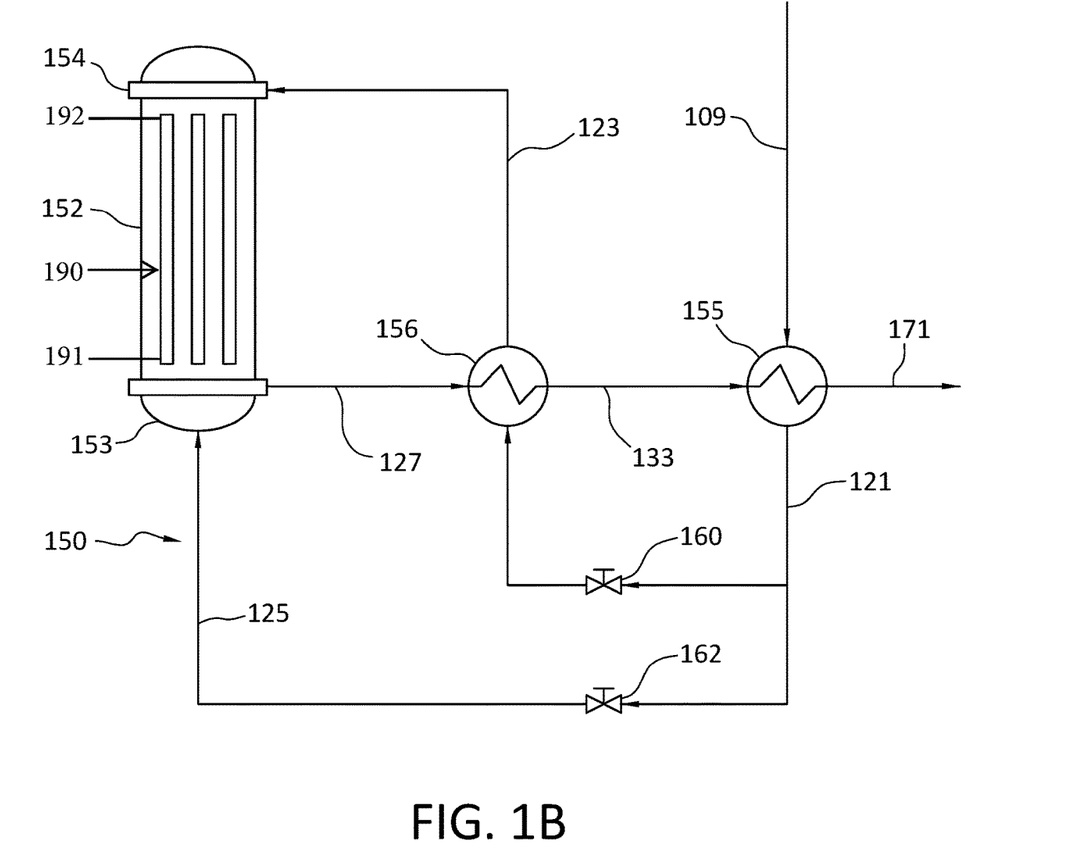
FIG. 1B is a simplified diagram of a load-following reactor and associated facilities according to the embodiment of FIG. 1A.

The reactor block 150 is shown in greater detail beginning in FIG. 1B. The reactor block 150 may comprise the combined reactant stream 109, which may comprise fresh feed and recycled reactants. In the embodiment of a methanol-synthesis reaction, the combined reactant stream 109 may comprise syngas having suitable fractions of $H_2$, CO, and/or $CO_2$ based on desired reaction conditions and a desired catalyst.

In the embodiment of FIG. 1B, the combined reactant stream 109 is heat integrated with the reactor effluent in a heat exchanger 155. In the embodiment of an exothermic methanol-synthesis reaction, the heat carried by the comparatively hot reactor effluents can pre-heat the combined reactants to a suitable temperature based on the reactor conditions. The heat exchanger 155, and all heat exchangers described herein, may be any suitable heat exchanger configuration having any suitable properties and operated in any suitable manner. For example, the heat exchanger 155 may be any of parallel- and counter-flow exchangers, finned and unfinned tubular heat exchangers, shell-and-tube, U-tube, single-pass straight and two-pass straight heat exchangers, plate and frame heat exchangers, plate-fin heat exchangers, microchannel heat exchangers, or otherwise.

The pre-heated combined reactant stream 121 can be diverted by a valve element 162 between first and second reactor feed lines 123, 125. The first reactor feed line 123 may be arranged to receive further pre-heating or heat exchange, and may be configured to be connect to the reactor 152 at a top portion 154 of the reactor 152. The first reactor feed line 123 may support a valve element 160. The second reactor feed line 125 supports the valve element 162, and may be configured to connect to the reactor 152 at a bottom portion 153 thereof. In the depicted embodiment, the reactor 152 may be a tube-cooled reactor comprising tubes 190 extending through a body thereof as described in, for example, U.S. Patent application publication no. 2019/0168155. That is, the tubes 190 may extend from the bottom portion 153 towards the top portion 154 of the reactor 152 in a generally counter-current fashion relative to a flow of the reactants, byproducts, and products flowing through the reactor 152.

The valve elements 160, 162 may be any suitable valve element, including but not limited to linear motion valves including gate, globe, diaphragm, pinch, and needle valves, rotary valves including ball, plug, and butterfly valves, self-actuated valves such as check and pressure-relief valves, or otherwise. The valve elements 160, 162 may include an actuator (not shown) configured to cooperate with the controller to adjust the valve element 160, 162 as necessary. The valve elements 160, 162 may be the same type and size of valve or may be different.

The reactants conveyed through the second reactor feed line 125 to the reactor 152 may flow upwardly through the tubes from the bottom portion 191 of the tubes 190 corresponding to the bottom portion 153 of the reactor, absorbing heat from the exothermic reaction taking place in the body of the reactor 152. The reactants may have achieved a substantial temperature increase by the time the reactants reach a top portion 192 of the tubes 190, corresponding to the top portion 154 of the reactor 152. Proximate or at the top portion 154 of the reactor 152, the heated reactants may exit the tubes 190 and enter the body of the reactor 152, thereby coming into contact with the catalyst arranged in the reactor body.

The catalyst may be any suitable catalyst. In the embodiment of a methanol-synthesis reactor, the catalyst may be, for example, a suitable Cu—Zn-based catalyst as is known to persons in the art. The catalyst may further be arranged in any suitable form and arrangement. In embodiments, the reactor 152 may define one or more catalyst beds upon which a quantity of the catalyst is arranged and through which the tubes may pass so as to effect a desired transfer of heat from each of the one or more catalyst beds.

In other embodiments, the catalyst may be packed in a single body within the reactor body. The catalyst may comprise any suitable substrate and the packing may comprise any suitable structures for enhancing contact between the reactants and the catalyst as the reactants flow downwardly from the top portion 154 toward the bottom portion 153. It will be appreciated that the depicted embodiment is merely exemplary and any suitable arrangement of the reactor may be utilized.

The first reactor feed line 123 may be configured to convey the reactant diverted therethrough directly to the top portion 154 of the reactor 152, and by bypassing the tubes, may skip the step of exchanging heat with the ongoing reaction participants. In an exothermic process such as methanol synthesis from syngas, skipping the step of extracting heat into the reactants from the ongoing reaction may serve to increase a temperature and a temperature profile of the reactor, as the heat builds up within the reactor body, the catalyst, and the reaction participants. Diverting a portion of the reactants through the first reactor feed line 123 thereby may sacrifice, at least temporarily and to a degree, efficiency of the reaction for increased speed of reaction, and in particular speeding a process of reaching steady-state operation.

The reactants diverted through the first reactor feed line 123 to the top portion 154 of the reactor 152 may be pre-heated external to the internal heat-exchange process of the reactor in a heat exchanger 156. The heat exchanger 156 may be heat-integrated with the reactor effluent stream 127 to provide heat to the first reactor feed line 123, thereby minimizing waste heat and reducing overall OPEX and emissions of the reactor system 100.

In embodiments, the heat exchanger 156 may be configured and operated so as to be maintained warm at all times, and irrespective of the operation of the valve elements 160, 162. By keeping the heat exchanger 156 warm at all times, the thermal inertia in the reactor 152 and associated facilities may be minimized and mitigated as the load-following reactor system 100 accommodates load changes, for example by simultaneously changing both the temperature of the reactants and the reactor 152.

Further, by maintaining the heat exchanger 156 warm at all or substantially all times, the load-following reactor system 100 is able to quickly and flexibly respond to load changes, thus improving the flexibility and responsiveness of the load-following system 100. These benefits are advantageously achieved by the provision, as discussed herein, of a heat exchanger and corresponding facilities relative to a non-load-following process design.

That is, the load-following reactor system and associated facilities embodiments of the disclosure address the problem of thermal inertia in reactors experiencing changing loads in a simplified, elegant, and lower-cost manner than existing solutions. The load-following reactor system and associated facilities embodiments further enable a facility incorporating the reactor system to operate transiently or non-continuously, thereby minimizing OPEX and starting up only when the flowrate of reactants and the disposition of products is economically advantaged.

Figure 1C:
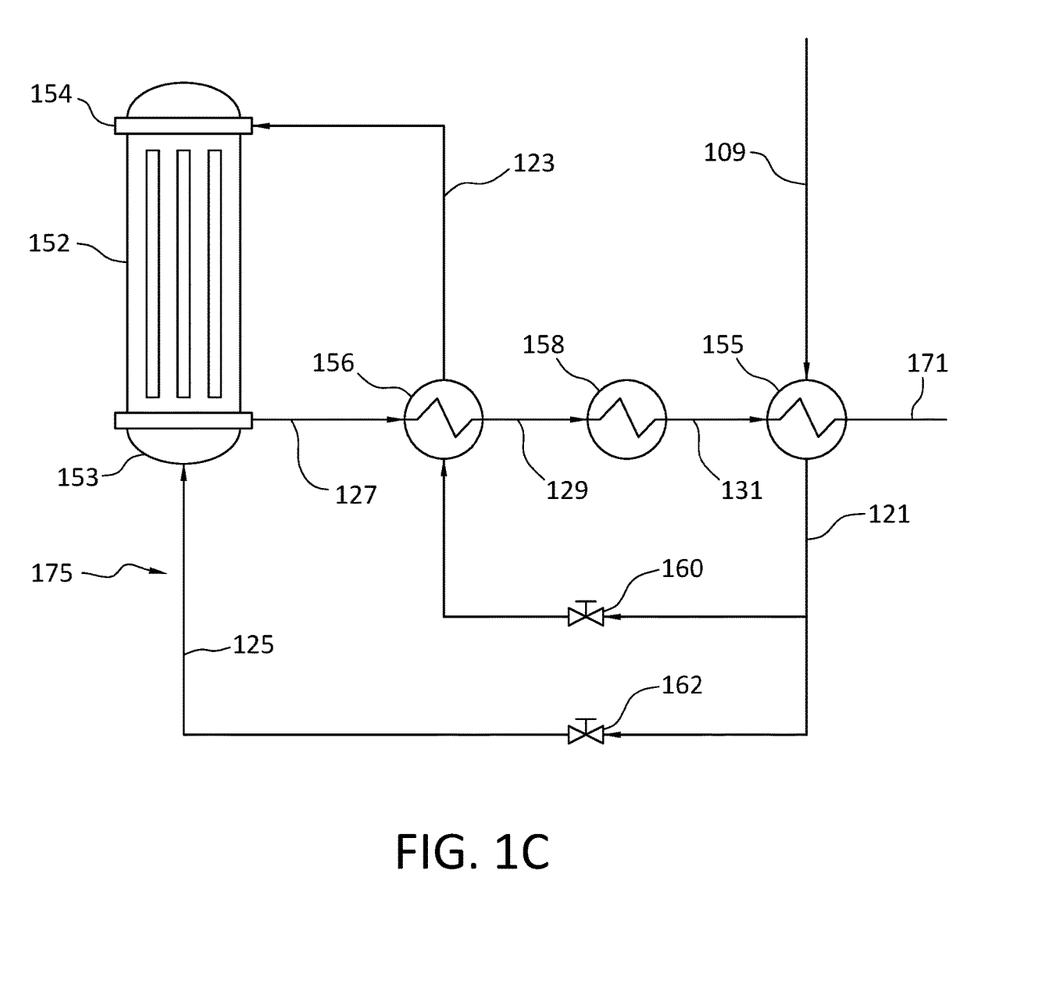
FIG. 1C is a simplified diagram of a variation of the load-following reactor of FIG. 1B.

While FIGS. 1B and 1C show the heat exchanger 156 as being heated against the reactor effluent line 127, it will be appreciated that the heat exchanger 156 may alternatively or additionally be heated by external facilities, including but not limited to electrical coils, combustion heat from fuel gas such as excess $H_2$, CO, or methanol, or by a suitable heat-exchange medium such as steam.

In the embodiment of an exothermic methanol-synthesis reaction, the heated reactor effluent stream 127 may be conveyed to the heat exchanger 156 to provide heat to the reactants diverted by the valve elements 160, 162 through the first reactor feed line 123. The partially cooled reactor effluent stream may be conveyed at stream 133 to the heat exchanger 155 to be further cooled against incoming reactant. The further cooled reactor effluent stream then may be conveyed at stream 171 out of the reactor block 150. The amount of heat transferred between the reactor effluent stream 127, 133 and the reactants, and the heat remaining in the reactor effluent stream 127, 133, 171, is controlled in particular by the degree to which the combined reactant stream 109 is diverted to the first reactor feed line 123.

The reactor system 100 may be provided with a controller configured to determine an appropriate proportion of the combined reactant stream 109 to divert through the first reactant feed line 123 as compared to the second reactant feed line 125 based on the dynamics and needs of the process at any given time. The controller may receive signals indicating process conditions such as flow rates, compositions, temperatures, and pressures and determine automatically an appropriate action by the valve elements 160, 162.

For example, the controller may receive a signal that a flowrate of fresh $H_2$ stream 103 has increased. Based on the degree of increase in the fresh $H_2$ stream 103, the controller may require that a proportion, for example 50% by volume, of the combined reactant stream 109 is diverted to the first reactor feed line 123 to increase the temperature of the reactor based on the increased flowrate of reactants. This the controller may accomplish by sending a signal to the actuator to adjust the valve elements 160, 162 by a corresponding amount. The controller may further require that the flowrate of fresh $CO_2$ stream 101 is increased stoichiometrically with the increase in the fresh $H_2$ stream 103.

It will be understood that the controller may respond to any process condition with any suitable adjustment. For example, the degree of increase or decrease in the flowrate of the fresh $H_2$ stream 103 may call for any suitable proportion of the reactants to be diverted to the first reactor feed stream 123 compared to the second reactor feed stream 125, ranging from 0% to 100% by volume, mass, or otherwise.

The controller may further or alternatively affect the operation of any suitable process condition, such as the pressure to which the compressors 104, 106 raise the reactant streams 105, 111, the amount of hydrogen extracted by the hydrogen recovery unit 120, the amount of heat to extract from the reactor effluents, or otherwise.

In a variation of the reactor block 150 shown in FIG. 1B, a reactor block 175 depicted in FIG. 1C may similarly incorporate a reactor 152 and first and second heat exchangers 155, 156 as described previously. In addition to the first and second heat exchangers 155, 156, the reactor block 175 may incorporate a third heat exchanger 158. In the depicted embodiment, the third heat exchanger 158 is shown as receiving the reactor effluent stream 129 before the first heat exchanger 155, but this embodiment is merely exemplary, and the third heat exchanger 158 may be arranged downstream of the first heat exchanger 155, upstream of the second heat exchanger 156, or in any suitable location.

The third heat exchanger 158 may be arranged to extract heat from the reactor effluent stream 129 for any suitable purpose. In certain embodiments, the heat extracted from the reactor effluent stream 129 in the third heat exchanger 158 may be provided to a downstream or unrelated process, as opposed to pre-heating the reactants in the reactor block 175.

An exemplary process for which the extracted heat may be used is to provide reboiler duty for a fractionation column downstream of the preliminary separations section 170. The fractionation column may be used to separate product methanol from contaminants such as water, as described in U.S. Patent application publication no. 2019/0168155. The third heat exchanger 158 as shown may alternatively be used to provide heat to such a process irrespective of the use of the first and second heat exchangers 155, 156 as shown. The use of the third heat exchanger 158 may likewise be controlled and enhanced by the controller.

A second valve element 160 is provided on the first reactor feed line 123 in addition to the first valve element 162 that is provided on the second reactor feed line 125. By providing an additional valve element 160, the controller may exert an additional degree of precise control over the amount of the reactants that is diverted between the first and second reactor feed lines 123, 125. For example, the second valve element 160 can completely arrest flow of the reactants to the first reactor feed line 123 as desired, and the valve element 162 can completely arrest flow of the reactants to the second reactor feed line 125 as desired, and any proportion therebetween.

Figure 2A:
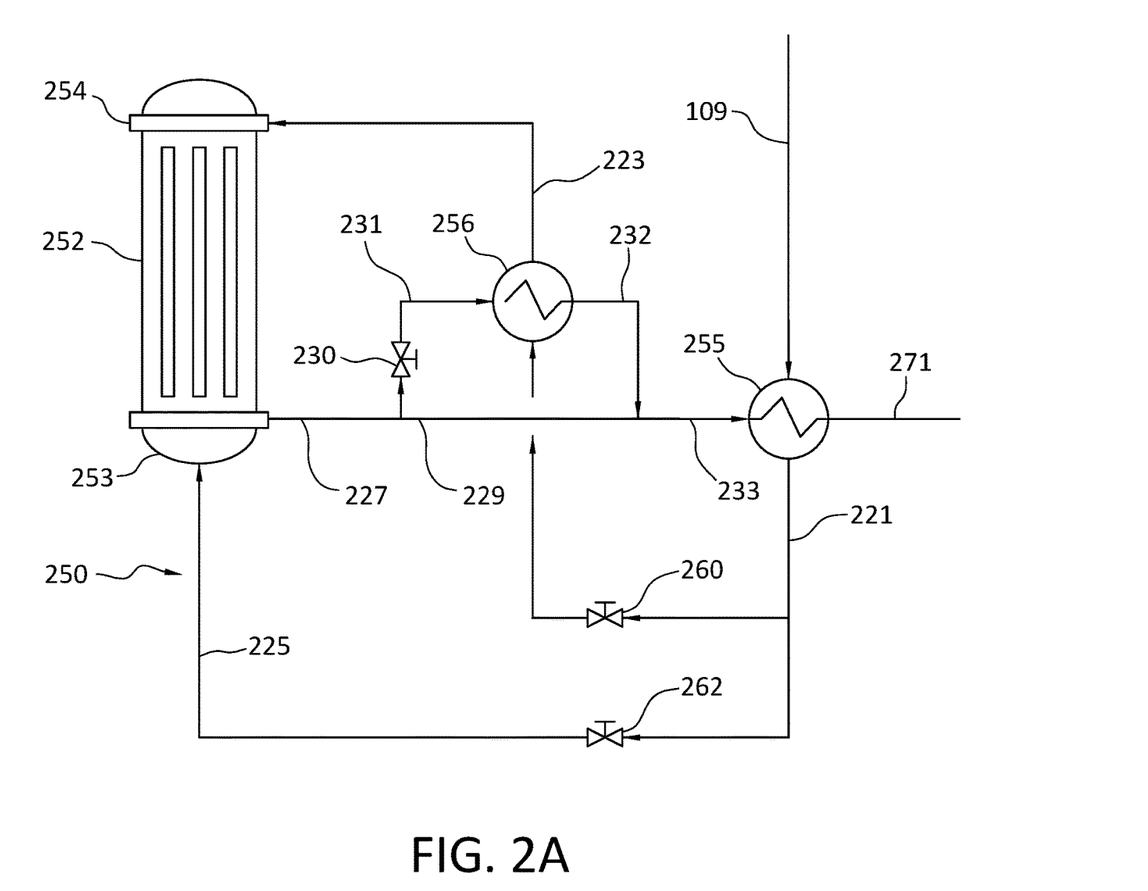
FIG. 2A is a simplified diagram of a load-following reactor and associated facilities according to another embodiment of the disclosure.
Figure 2B:
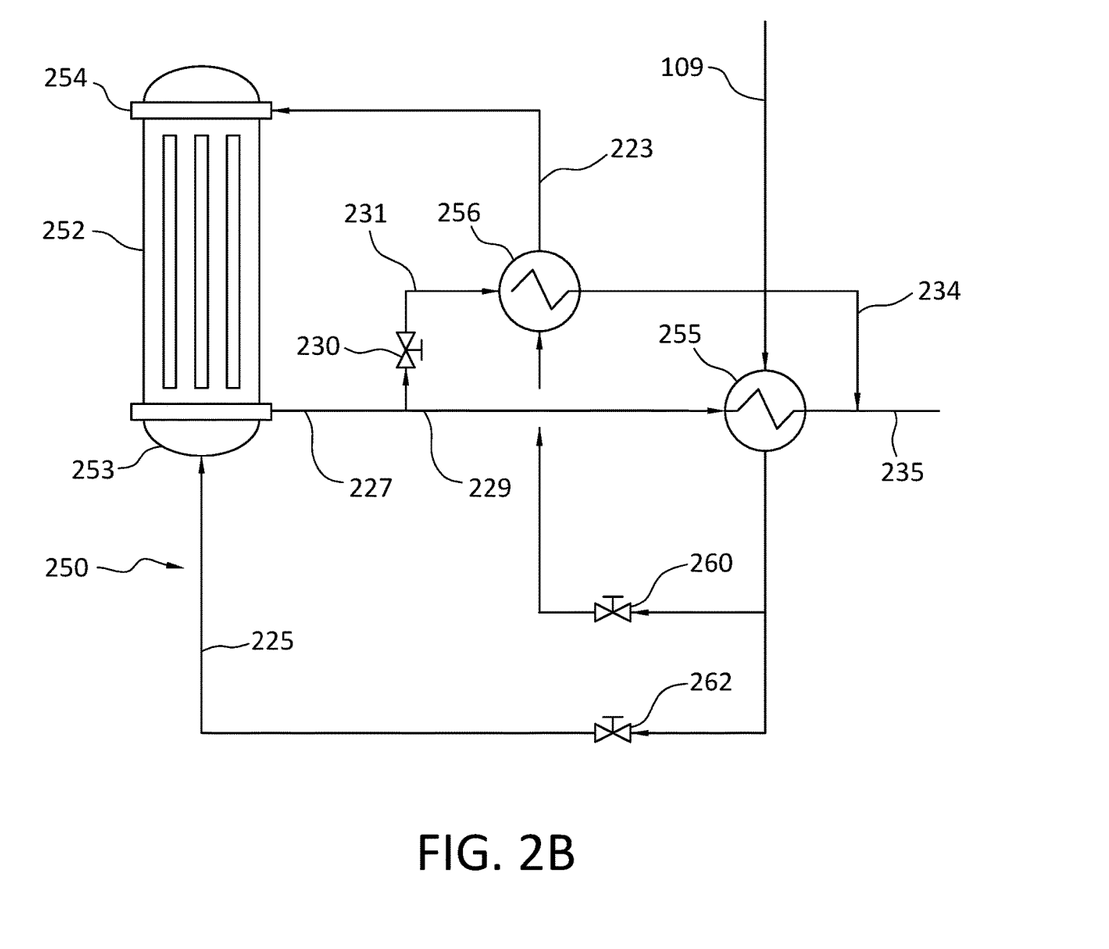
FIG. 2B is a simplified diagram of a variation of the load-following reactor and associated facilities of FIG. 2A.

A variation of the reactor block 150 is shown in the embodiment of FIGS. 2A and 2B. A reactor block 250 may be similarly integrated in a reactor system 100 as shown in FIG. 1A. The reactor block 250 may comprise a reactor 252 having a top portion 254 and a bottom portion 253, and may be configured with one or more tubes extending through a body thereof. The combined reactant feed stream as before, may be arranged to be diverted to a desired degree to a first reactor feed line 223 compared to a second reactor feed line 225. The combined reactant feed 109 may be pre-heated in a first heat exchanger 255 prior to being diverted. The first reactor feed line 223 may be arranged to feed the diverted reactant to the top portion 254 of the reactor 252 after being pre-heated in a second heat exchanger 256, which may be heat-integrated with the reactor effluent.

The second heat exchanger 256 may extract heat from only a desired proportion of the reactor effluent stream 227. A third valve element 230 and a corresponding actuator may be controlled by the controller to divert a desired amount of the reactor effluent stream 227 to the second heat exchanger 256 through line 231. A remaining portion of the reactor effluent stream 227 may be conveyed through line 229 toward the first heat exchanger 255. After the desired amount of heat has been extracted from the reactor effluent in line 231, it is conveyed in line 232 back toward the remainder of the reactor effluent stream 229. In the depicted embodiment of FIG. 2A, the remainder of the reactor effluent stream 229 may receive or rejoin with the diverted portion 232 before heat is extracted from reactor effluent line 233 in the first heat exchanger 255. The reactor effluent line 271 may finally be conveyed out of the reactor block 250 to downstream processes described previously.

The amount of the reactor effluent stream 227 that is diverted by the third valve element 230 may be determined by the controller based on a proportion of the reactant feed 109 that is diverted to the first reactor feed line 223 from the second reactor feed line 225 by the first and second valve elements 260, 262, which, as described previously, can be actuated by the controller to provide any desired split of the combined reactor feed 109 to the reactor feed lines 223, 225.

In embodiments, a smaller proportion of the combined reactor feed 109 diverted to the first reactor feed line 223 may correspond to a smaller proportion of the reactor effluent stream 227 that is diverted by the third valve element 230 to the heat exchanger 256. In other embodiments, the amount of the reactor effluent line 227 that is diverted to the heat exchanger 256 is increased by the controller primarily based on when the reactor temperature needs to be rapidly increased by a certain amount. Similar to the foregoing embodiments, the heat exchanger 256 may be maintained warm for all or substantially all of the time the load-following reactor system is operating to increase the flexibility and responsiveness of the load-following reactor system, and may be maintained warm by any suitable means as described above regarding the heat exchanger 156.

A variation is shown in FIG. 2B. Like the embodiment of FIG. 2A, the temperature and/or other conditions of the reactor 252 may be controlled by diverting a portion of a combined reactor feed 109 through a first reactor feed line 223 compared to a second reactor feed line 225. The heat exchanger 256 that may further pre-heat a diverted portion of the reactants in the first reactor feed line 223 may heat the reactants directly through a heating element or heat derived from an external source, or against a portion of the reactor effluent line 227, which can be diverted by a third valve element 230 as directed by a controller in response to one or more indications of process conditions, such as a reactor temperature, pressure, reactant flowrate, or otherwise.

In contrast to the variation of FIG. 2A, the portion of the reactor effluent line 227 that is diverted through the heat exchanger 256 in line 231 may be rejoined with the remainder of the reactor effluent line through a line 234 downstream of the heat exchanger 255. The recombined reactor effluent stream 235 may then be conveyed out of the reactor block 250. In this embodiment, the amount of heat exchanged in both of the heat exchangers 255, 256 can be fine-tuned and adjusted by the controller such that a temperature profile of the reactor 252 or any other suitable process condition may be adjusted based on another changing process condition, such as a flowrate of a reactant like $H_2$.

Figure 3:
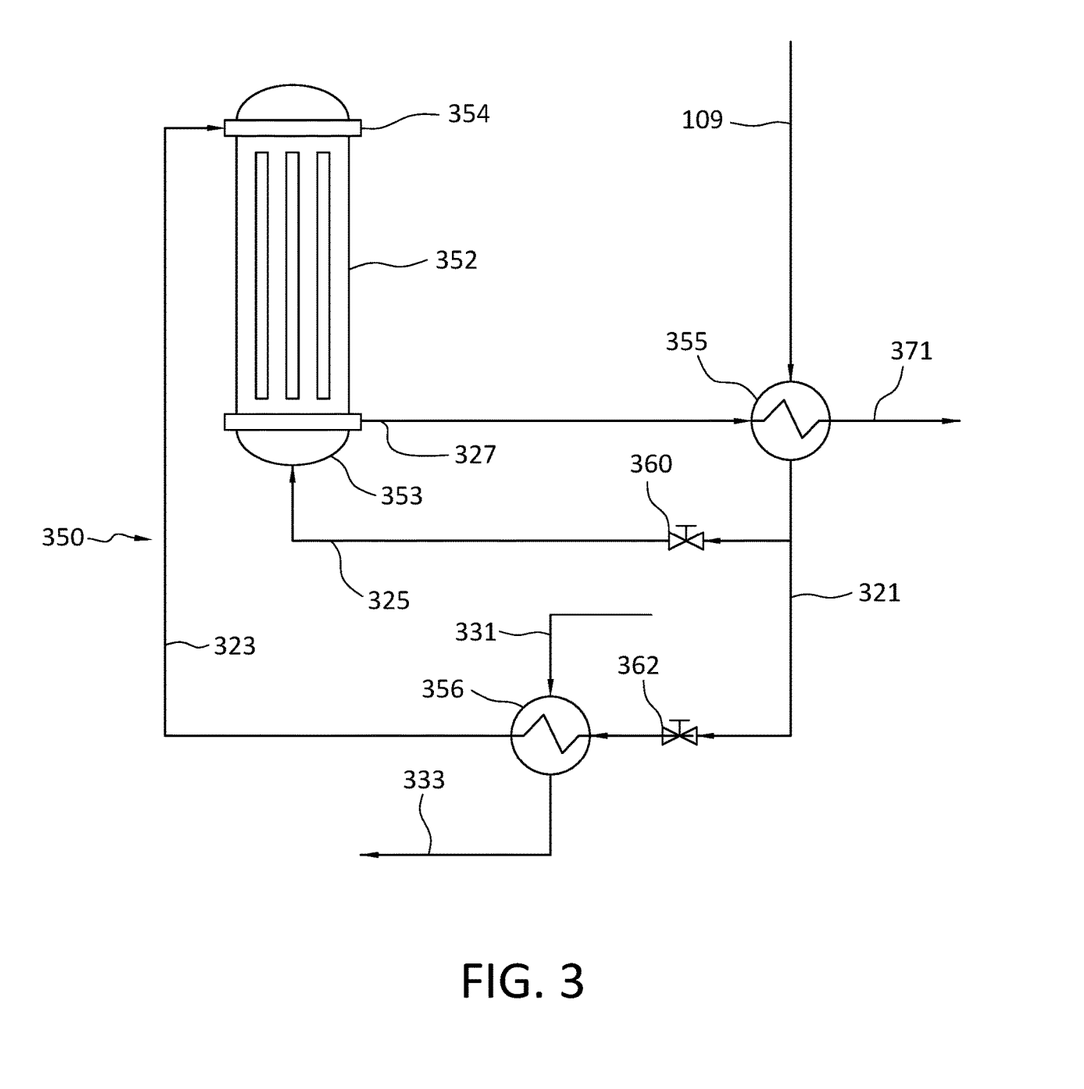
FIG. 3 is a simplified diagram of a load-following reactor and associated facilities according to another embodiment of the disclosure.

Another embodiment of the load-following reactor and associated facilities is shown in FIG. 3. A reactor block 350 similar to the foregoing embodiments may comprise a reactor 352 and at least one heat exchanger 355, 356 configured for pre-heating a combined reactor teed 109 based on and in response to a changing process condition. The heat exchanger 355 may be arranged as a heat-integration heat exchanger as in previous embodiments, with a reactor effluent line 327 serving to provide pre-heat to the reactants, with the cooled reactor effluent line 371 conveyed out of the reactor block 350 to downstream processes.

The heat exchanger 356 may be configured to utilize a heat-exchange medium external to the reactants and effluent of the reactor block 350. In embodiments, a suitable heat-exchange medium is provided to the heat exchanger 356 at line 331, and exits at line 333. The heat-exchange medium may be steam of any suitable pressure, for example low-pressure (LP) steam, medium-pressure (MP) steam, high-pressure (HP) steam, super-high-pressure steam (SHP), or otherwise. The heat-exchange medium may be waste heat from a separate process. In other embodiments, or in addition, the heat-exchange medium may be provided by an electric heater.

As described previously, the reactor block 350 may be configured to divert a desired proportion of the combined reactant feed 109 to an additional pre-heating procedure in the first reactor feed line 323 through the actuation of one or both of the first and second valve elements 360, 362, which may be diverted to a top portion 354 of the reactor 352. As a process condition such as the flowrate of a fresh $H_2$ feed changes, for example, the controller may detect that a temperature, pressure, or other process condition of the reactor 352 or another facility is ill-suited or mismatched to the changed process conditions.

As an increase in renewable electrical energy is used to produce $H_2$ from electrolyzing water in embodiments, with a stoichiometric increase in the flowrate of $CO_2$ provided, the temperature of the reactor may be too low to achieve an efficient and equilibrated steady-state operation. In contrast to existing methods of operating reactors, which typically involve slow and/or ineffective adjustments to process conditions in an attempt to achieve steady-state operations, the reactor system and associated facilities of the embodiments of the disclosure are able to provide an improved process for adjusting process conditions, and with a simplified flow plan. While a stoichiometric increase in the flowrate of $CO_2$ is described, it will be appreciated that the load-following reactor system and associated facilities may utilize any suitable ratio and flowrate of reactants. For example, excess $H_2$ may be utilized to increase the rate of reaction and to improve the conversion of $CO_2$.

Figure 4:
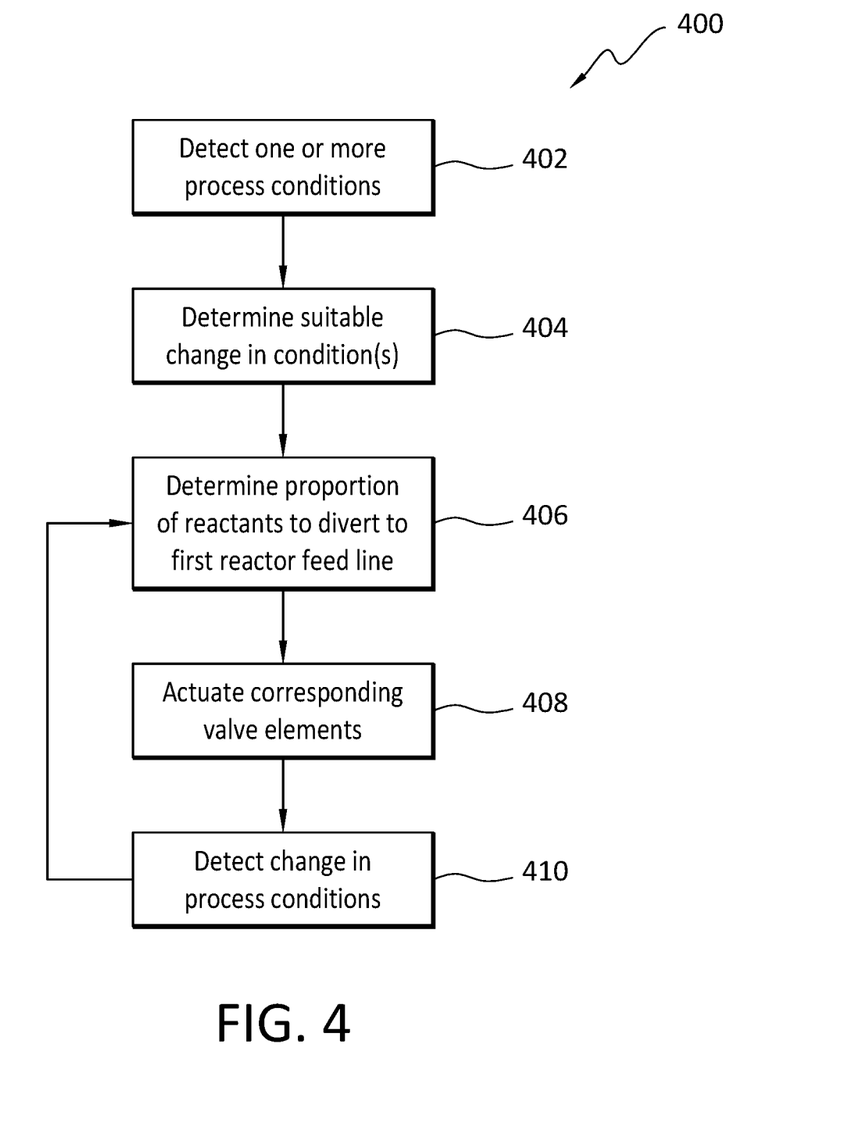
FIG. 4 is a simplified diagram of a method of operating a load-following reactor system and associated facilities according to the disclosure.

A method for operating the reactor system and associated facilities of the embodiments of the disclosure is shown in FIG. 4. The method 400 of operating the load-following reactor and associated facilities includes a first step 402 of detecting one or more process conditions. This may include, in particular, detecting a flowrate or predicted flowrate of a reactant, such as $H_2$. A second step 404 includes determining a suitable change in one or more conditions, which may be based on and in response to a changed process condition detected in the first step 402. For instance, the controller may detect that based on an increased flow of $H_2$, a reactor temperature should increase by, for instance, 10° C., in order to achieve optimal operation at the increased flowrate. A target temperature may be determined based on the flowrates of the reactants, in an embodiment. Multiple conditions may need to be changed. A stoichiometric increase of fresh $CO_2$ may need to be effected along with an increase in temperature of the reactor, a change in the pressure of the compressors, or otherwise.

A third step 406 involves determining a proportion of the reactants to the reactor block that should be diverted to a first reactor feed line compared to a second reactor feed line. The reactor system may have a default operation in which the reactants are entirely diverted through a second reactor feed line which is delivered to the bottom portion of the reactor, for example. In order to effect a change in a reactor condition such as temperature, a certain proportion of the reactants may need to be diverted to the first reactor feed line which can be delivered at the top of the reactor (thereby bypassing the heat-exchange that takes place in the tubes of a reactor), and may also require additional pre-heat in order to raise the reactor temperature. The controller may determine how much of the reactants must be diverted, for instance based on a percent volume of the reactants, in order to quickly, stably, and safely effect the desired process change.

A fourth step 408 involves actuating one or more corresponding valve elements in order to divert a desired amount of reactants to the first reactor feed line compared to the second reactor feed line. Based on the type of valve element employed at a certain location in the reactor block, a 10% diversion by volume of the reactants may require a 50% closure of a globe valve element on the second reactor feed line. All such calculations will be subject to the individual process constraints and conditions, including the composition of the reactants, the reactor type, the catalyst type, the efficiency of the heat exchangers, and/or otherwise.

A fifth step 410 involves detecting a change in the process conditions as a result of diverting the proportion of the reactants to the first reactant feed line. Detection in the fifth step 410 and in any other pertinent step may be accomplished by suitable sensors, including thermocouples, pressure transducers, flow meters, and otherwise. The sensors may be configured to communicate with the controller to indicate a current state of the process conditions through the reactor system and associated facilities. For example, thermocouples or other suitable temperature sensors may be arranged at various locations of the reactor. The thermocouples, for example, may be arranged at the top and bottom portions of the reactor as well as at least one location in the body of the catalyst proximate the catalyst, and at one or more of any catalyst beds in the reactor body, for example. The temperature of the reactor effluent line, the combined reactant feed, the first and second reactor feed lines, the heat exchangers, and any other suitable line or facility may likewise be obtained, monitored, and used to determine an appropriate actuation of the valve element.

To the extent that the desired process condition has not been achieved—as indicated by the detected changes—the third, fourth, and fifth steps 406, 408, and 410 may be repeated one or more times until the desired change is achieved. It will be appreciated that any suitable process control scheme or strategy may be utilized, including feedback, feedforward, proportional, integral, derivative, proportional-integral, proportional-derivative, integral-derivative, model predictive, combinations thereof, or otherwise may be utilized by the controller to determine a suitable process condition based on a detected process-condition change, to determine a suitable proportion of reactants to divert to the first reactor feed line, and to determine a degree of actuation of the valve elements that should be conducted to effect the desired process condition.

The controller may comprise a processor, storage, I/O interfaces, and other suitable components for receiving signals from sensors, determining process-condition change, determining a suitable proportion of reactants to divert to the first reactor feed line, and/or determining a degree of actuation of the valve elements.

By providing a load-following reactor, associated facilities, and method for operating the same according to the disclosed embodiments, the problem of existing processes insufficiently, inefficiently, and suboptimally responding to changing process conditions, particularly in the context of responding to a change in a flowrate of a reactant and overcoming the thermal inertia of a reactor, is addressed. The disclosed embodiments of load-following reactor systems, associated facilities, and method for operating the same provide a simplified, effective, and improved manner for adjusting a desired process condition such as a reactor temperature in response to a change in a different process condition, such as reactant flowrate. The load-following reactor, associated facilities, and method for operating the same advantageously reduces the time for a reactor to reach thermal equilibrium, particularly during periods of changing flowrates and conditions, as is common in a load-following reactor system.

It is to be understood that not necessarily all objects or advantages may be achieved under any embodiment of the disclosure. Those skilled in the art will recognize that the load-following reactor, associated facilities, and method for operating the same may be embodied or carried out in a manner that achieves or optimizes one advantage or group of advantages as taught without achieving other objects or advantages as taught or suggested.

The skilled artisan will recognize the interchangeability of various disclosed features. Besides the variations described, other known equivalents for each feature can be mixed and matched by one of ordinary skill in this art to make or use a load-following reactor and associated facilities under principles of the present disclosure. It will be understood by the skilled artisan that the features described may be adapted to other types of chemical species and processes. Hence this disclosure and the embodiments and variations thereof are not limited to methanol synthesis processes or to load-following applications, but can be utilized in any chemical or energy-related process.

Although this disclosure describes certain exemplary embodiments and examples of a load-following reactor, associated facilities, and methods of operating the same, it therefore will be understood by those skilled in the art that the present disclosure extends beyond the specifically disclosed embodiments to other alternative embodiments and/ or uses of the disclosure and obvious modifications and equivalents thereof. It is intended that the present disclosure should not be limited by the particular disclosed embodiments described above.

The invention claimed is:

1. A load-following reactor system, comprising:
   at least one reactor configured for carrying out at least one chemical reaction;
   a reactant line configured to convey a flow of reactants;
   a first heat exchanger through which a first portion of the flow of reactants is configured to pass by means of a first feed line to the at least one reactor, wherein the first heat exchanger employs a heat exchange medium external to heat generated from the at least one reactor, to pre-heat the first portion of the flow of reactants;
   at least one valve element configured to control a flowrate of the first portion to the first feed line; and
   at least one second feed line connected to the at least one reactor through which a remainder portion of the flow of reactants is configured to pass.

2. The load-following reactor system of claim 1, wherein the first heat exchanger employs steam as the heat exchange medium.

3. The load-following reactor system of claim 1, wherein the first heat exchanger employs at least one of low pressure steam, medium pressure steam, high pressure steam, or super-high pressure steam as the heat exchange medium.

4. The load-following reactor system of claim 1, wherein the first heat exchanger employs waste heat from a separate process as the heat exchange medium.

5. The load-following reactor system of claim 1, wherein the first heat exchanger is an electric heater.

6. The load-following reactor system of claim 1, wherein the first heat exchanger employs combustion heat from combustion of fuel gas to pre-heat the first portion of the flow of reactants.

7. The load-following reactor system of claim 6, wherein the fuel gas comprises one or more of excess $H_2$, CO, or methane.

8. The load-following reactor system of claim 1, wherein the at least one valve element comprises a first valve and a second valve arranged on the first and at least one second feed lines, respectively.

9. The load-following reactor system of claim 1, further comprising a second heat exchanger arranged as a heat-integration heat exchanger.

10. The load-following reactor system of claim 9, wherein the heat-integration heat exchanger is heated by an effluent line of the at least one reactor and transfers a portion of heat from the effluent line to the reactant line.

11. The load-following reactor system of claim 9, wherein the heat-integration heat exchanger is arranged to transfer heat from the effluent line to the reactant line, the heat-integration heat exchanger being upstream from the first heat exchanger.

12. The load-following reactor system of claim 1, wherein the reactant flow comprises a fresh $CO_2$ feed and a fresh $H_2$ feed.

13. The load-following reactor system of claim 12, wherein the at least one reactor comprises a plurality of tubes configured to convey the flow of reactants counter to a flow direction of the reactants, byproducts, and products within a body of the at least one reactor.

14. The load-following reactor system of claim 12, wherein the first portion of the flow of reactants is delivered to an end portion of the tubes.

15. The load-following reactor system of claim 12, wherein the first portion of the flow of reactants is delivered to an end portion of the tubes at a top portion of the at least one reactor.

16. The load-following reactor system of claim 14, wherein the remainder of the flow of reactants is delivered to a beginning portion of the tubes.

17. The load-following reactor system of claim 15, wherein the remainder of the flow of reactants is delivered to a beginning portion of the tubes at a bottom portion of the at least one reactor.

18. The load-following reactor system of claim 1, wherein the at least one reactor is a methanol synthesis reactor comprising a methanol-synthesis catalyst.

19. A load-following reactor system, comprising:
   at least one reactor configured for carrying out at least one chemical reaction;
   a reactant line configured to convey a flow of reactants;
   a first heat exchanger through which a first portion of the flow of reactants is configured to pass by means of a first feed line to the at least one reactor;
   at least one valve element configured to control a flowrate of the first portion to the first feed line;
   at least one second feed line connected to the at least one reactor through which a remainder portion of the flow of reactants is configured to pass; and
   an additional heat exchanger for extracting heat from an effluent line of the at least one reactor, wherein the additional heat exchanger delivers heat from the effluent line for an external purpose, other than pre-heating reactants for the at least one reactor.

20. The load-following reactor system of claim 19, wherein the additional heat exchanger delivers heat from the effluent line for reboiler duty for a fractionation column.

* * * * *